United States Patent
Birru et al.

(10) Patent No.: US 9,650,831 B2
(45) Date of Patent: May 16, 2017

(54) OPEN-LOOP CLOSED-LOOP INTEGRATED DAYLIGHT AND ARTIFICIAL LIGHT CONTROL WITH MULTIPOINT SENSOR CALIBRATION

(71) Applicant: PHILIPS LIGHTING HOLDING B.V., Eindhoven (NL)

(72) Inventors: Dagnachew Birru, Yorktown Heights, NY (US); Yao-Jung Wen, Concord, CA (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 417 days.

(21) Appl. No.: 14/241,465

(22) PCT Filed: Sep. 24, 2012

(86) PCT No.: PCT/IB2012/055066
§ 371 (c)(1),
(2) Date: Feb. 27, 2014

(87) PCT Pub. No.: WO2013/046112
PCT Pub. Date: Apr. 4, 2013

(65) Prior Publication Data
US 2014/0209254 A1    Jul. 31, 2014

Related U.S. Application Data

(60) Provisional application No. 61/539,187, filed on Sep. 26, 2011.

(51) Int. Cl.
*G05B 15/02*   (2006.01)
*G05B 19/042*   (2006.01)
(Continued)

(52) U.S. Cl.
CPC ............... *E06B 9/68* (2013.01); *G05D 25/02* (2013.01); *H05B 37/0218* (2013.01); *E06B 9/32* (2013.01);
(Continued)

(58) Field of Classification Search
None
See application file for complete search history.

(56) References Cited

U.S. PATENT DOCUMENTS 6,069,465 A * 5/2000 de Boois ............... G05B 19/042
                                                                    318/41
7,111,952 B2    9/2006 Veskovic
(Continued)

FOREIGN PATENT DOCUMENTS

CN    101660744 A    3/2010
CN    101737703 A    6/2010
(Continued)

OTHER PUBLICATIONS

Byoung-Chul Park et al, "Performance of integrated systems of automated roller shade systems and daylight responsive dimming systems", Elsevier, Building and Environment, 46, (2011), 747-757.
(Continued)

*Primary Examiner* — Ronald Hartman, Jr.

(57) ABSTRACT

A system and method of controlling light distribution in a space including an installed light source, an external light source, at least one blind(s) for a window in the space, a lighting control unit and a daylight/blind control unit, the method includes, in the lighting control unit, estimating task illuminances from the installed light source and the external light source at a plurality of measuring areas within the space, determining an intensity level of each of the installed light source based on the estimated illuminances; and determining a first positioning of the blinds according to prede-
(Continued)

termined requirements and/or measurements, in the daylight/blind control unit, receiving the plurality of measuring areas data within the space, determining a second positioning of the blinds according to predetermined requirements, selecting either the first or second positioning of the blinds to provide optimal daylight comfort, glare prevention and view.

15 Claims, 4 Drawing Sheets (51) Int. Cl.
  *E06B 9/68*     (2006.01)
  *G05D 25/02*    (2006.01)
  *H05B 37/02*    (2006.01)
  *E06B 9/32*     (2006.01)

(52) U.S. Cl.
  CPC ............... *E06B 2009/6818* (2013.01); *E06B 2009/6827* (2013.01); *Y02B 20/46* (2013.01)

(56) References Cited

U.S. PATENT DOCUMENTS

| | | | |
|---|---|---|---|
| 7,566,137 B2 | 7/2009 | Veskovic | |
| 7,923,948 B2* | 4/2011 | Rodas | E06B 9/322 318/266 |
| 8,624,529 B2* | 1/2014 | Neuman | E06B 9/32 160/10 |
| 8,901,604 B2* | 12/2014 | Mishra | H01L 29/0619 257/170 |
| 9,085,931 B2* | 7/2015 | Ackermann | E06B 9/322 |
| 2005/0013155 A1 | 1/2005 | Nikitin et al. | |
| 2005/0110416 A1 | 5/2005 | Veskovic | |
| 2005/0131554 A1 | 6/2005 | Bamberger et al. | |
| 2009/0223639 A1* | 9/2009 | Wang | B60J 1/2011 160/7 |
| 2009/0308543 A1* | 12/2009 | Kates | E06B 9/44 160/5 |
| 2010/0006241 A1 | 1/2010 | Veskovic | |
| 2011/0094687 A1* | 4/2011 | Fraser | E06B 9/322 160/176.1 R |
| 2011/0214823 A1* | 9/2011 | Hu | E06B 9/30 160/168.1 R |
| 2011/0220299 A1* | 9/2011 | Berman | E06B 9/322 160/5 |
| 2011/0240232 A1* | 10/2011 | Kluck | A47H 5/0325 160/5 |
| 2011/0251720 A1* | 10/2011 | Neuman | E06B 9/32 700/275 |
| 2012/0053731 A1* | 3/2012 | Feldstein | E06B 9/42 700/275 |
| 2012/0067527 A1* | 3/2012 | Cheng | E06B 9/262 160/84.02 |
| 2012/0150485 A1* | 6/2012 | Wang | G01J 1/0219 702/150 |

FOREIGN PATENT DOCUMENTS

| | | |
|---|---|---|
| CN | 101761864 A | 6/2010 |
| EP | 0659035 A1 | 6/1995 |
| JP | 2005188137 A | 7/2005 |
| JP | 2007120088 A | 5/2007 |
| JP | 2008156817 A | 7/2008 |
| WO | 2007091143 A2 | 8/2007 |

OTHER PUBLICATIONS

Maximilien Leclercq et al, "Control of visual conditions for open-plan offices", Elsevier, Mechatronics, 21 (2011), pp. 581-593.

Satyen Mukherjee et al, "Closed Loop Integrated Lighting and Daylighting Control for Low Energy Buildings", 2010, ACEEE Summer Study on Energy Efficiency in Buildings, pp. 9-252 to 9-269.

* cited by examiner

OPEN-LOOP CLOSED-LOOP INTEGRATED DAYLIGHT AND ARTIFICIAL LIGHT CONTROL WITH MULTIPOINT SENSOR CALIBRATION

CROSS-REFERENCE TO PRIOR APPLICATIONS

This application is the U.S. National Phase application under 35 U.S.C. §371 of International Application No. PCT/IB2012/055066, filed on Sep. 24, 2012, which claims the benefit of U.S. Provisional Patent Application No. 61/539,187, filed on Sep. 26, 2011. These applications are hereby incorporated by reference herein.

This invention relates to lighting controls and, more particularly, to a method and a system for controlling light distribution in a space including multiple installed light sources and an external light source.

There is growing evidence that daylight and view to outside improves health, wellbeing, and productivity. Existing automated window treatment controls and photo controlled electric lighting systems are far from being optimal in this regard. Their operation is often not appreciated by the users, therefore leading the users to disable them, resulting in lost opportunities of creating a comfortable and energy-efficient lighting environment. One of the problems stems from the deployment of independently controlled daylight (window treatments) and electric lights controllers.

Most of existing window treatments are operated manually, thereby resulting in lost opportunity in energy savings as well as comfort. There is an increased movement toward automated control of these systems for efficient daylight integration in the room. Such systems are installed in modern commercial buildings. These systems usually operate using open-loop controls based on a form of solar clock, model of the building and its surroundings. Practical tests of such systems have reportedly resulted in subpar performance:

Identical blinds in adjacent rooms behaved differently

Blinds allowed direct sun to reach inside under clear sky (thereby creating discomfort glare) while not opening fully under overcast sky even when the indoor light level was very low One cause of the issues is that the systems are designed for open loop operation, with certain assumptions about the interior and exterior environment. These assumptions are often not necessarily correct or problems arise when the environment changes (examples: trees, building or demolished, etc.).

Recently, 'integrated' control systems have been disclosed in some US patents. The following are two examples.

U.S. Pat. No. 7,111,952 B2 discloses a combined controller for window treatments and electric lights. This system includes daylight sensing to control the dimming levels of the electric lights and the amount of daylight in the room. This system uses a central controller to control the subsystems. However, the operation is sequential, i.e., first window treatments are adjusted until fully open/closed, and then electric lights are adjusted to provide the remaining required light.

U.S. Pat. No. 7,566,137 B2 discloses a combined electric light and window treatment controller based on either a single sensor or multiple sensors. The electric lights are grouped into zones with either the single sensor or the multiple sensors. In the case of multiple sensors, the output of these sensors is simply averaged. The multi-zone control is achieved through pre-programmed controllers present in each zone. The combined window treatment and electric light controller is based on a sequential operation: e.g., first the blinds are closed or opened, then the electric lights are adjusted.

One common shortcoming of the above systems is that they operate sequentially, e.g., first the blinds close/open fully, followed by the operation of the electric lights. Such a system has the potential to dissatisfy the users. For example, when users change the set points or an occupancy sensor detects a changing environment and settings need to be changed (such as from OFF to ON position), users will have to wait until the sequential operation is completed to see if the lighting preferences are met. Since window treatments operate slowly, the overall waiting time can be several seconds long, if not a minute or more. With today's need for fast responses, users may not tolerate such a long waiting time and will eventually revert to fully manual controls.

In the case of a non-uniform distribution of daylight, U.S. Pat. No. 7,566,137 proposes the use of pre-set values for electric lighting in each zone. Such a system is expensive, as it requires calibration during installation as well as continued maintenance when the building condition (interior or exterior) changes. This patent mentions a multisensory approach, but the main purpose is to increase the robustness by simple averaging of the output of these sensors. Such an averaging may work for uniform distribution light requirements, but not for controlled non-uniform distributions. In addition, such a system is not optimal in terms of energy savings.

A more optimal solution is a closed-loop blind control, one that adjusts the blind height and slat angles based on interior lighting conditions as well as supplemental open-loop control for additional glare avoidance. However, such a system cannot be installed in a space where there is also closed-loop electric light control as there will be significant performance issues. More optimal solution is an integrated controller, one that controls both the window treatments and electric lights. However, this requires integration of the control systems, requiring one manufacturer to handle both systems.

On the lighting side, recent studies from surveys indicated that most advanced photo-controlled lighting control systems failed to meet performance expectations. In particular, their performance degrades in day-lit spaces which also typically equip with venetian blinds. The fundamental reason of performance failure is the changing reflection in the environment as the slat angles and sun position change in the space. Such variation in space reflection is not handled properly by existing systems. A better solution is one that is aware of the position of the blinds, the amount of daylight and the sun's angle of incidence. This is referred to as work plane luminance estimation in the case of multiple sensors, or multipoint calibration in the case of a single photo sensing environment. But, such a system requires knowledge of the day lighting environment.

Thus, there is a need for an integrated daylight and artificial light control system that utilizes a multipoint sensor calibration device.

This disclosure includes a system that is based on information exchange between the lighting systems, both electric and daylight/blind controllers, for a closed-loop open-loop system with multipoint sensor calibration (dynamic sensor gain) and workplane illuminance estimation. The daylight/blind control includes venetian blinds, roller shades, electrochromic windows etc. However, without of loss of generality, we will use the term 'venetian blinds' or simply 'blinds'.

In the lighting controls portion, the (closed loop) lighting control unit for electric lighting and window blind slat angle control is implemented performing:

- Estimation of work-plane illuminance based on multiple calibration points. The multiple calibration points will be a function of blind slat angles, height and daylight entering the room
- Calculation/determination of the dimming level of the electric light according to photo sensor, user set points and occupancy sensors
- Calculation/determination of the slat angle positions according to photo sensor and user set points
- Transmit the slat angle position (or increment/decrement) to the blind controller
- Communicate the status of motion sensor and weather condition sensors In the blind controls portion, the (open-loop) daylight/blind (comfort) control unit is implemented. In addition to a geography-based controller, a comfort controller is included to select between the closed-loop information of the lighting control unit and open-loop information of the daylight/blind control unit. The system operates according to the following:

- Calculate/determination the blind heights and angles based on geographical location and geometrical information of the building and windows
- Comfort controller selects between the blind positioning information coming respectively from the (closed-loop) lighting controller and the (open-loop) daylight/blind controller in such a way that prevents glare and provide optimal daylight comfort and view to outside
- The daylight/blind (comfort) controller communicates the blind slat angle position and height to the (closed-loop) lighting controller.

This disclosure includes a framework for an adaptive integrated control of window treatments (e.g. blinds, shades, etc.) and electric lights to optimize the overall light distribution according to given requirements. The control system contains two controllers, one in the (closed-looped) lighting control unit for joint control of daylight and electric light, and another in the daylight/blind (comfort) control unit for control of the daylight only. The multisensors sample the lighting conditions in the space, and in certain embodiments the multisensors may be distributed. The proposed framework allows an optimal control of daylight (e.g., window blinds, shades, etc.) with electric lights, making use of multisensors and an integrated-independent dual control system.

In one embodiment, the invention relates to a method of controlling light distribution in a space including multiple installed light sources, an external light source, at least one blind(s) for a window in the space, a lighting control unit and a daylight/blind control unit, the method includes: in the lighting control unit, estimating task illuminances from the multiple installed light sources and the external light source at a plurality of measuring areas within the space, controlling the intensity level of each of the installed light sources and an amount of light from the external light source entering the space based on the estimated illuminances, and determining a first positioning of the blinds according to predetermined requirements and/or measurements, in the daylight/blind control unit, receiving the plurality of measuring areas data within the space, determining a second positioning of the blinds according to predetermined requirements, selecting either the first or second positioning of the blinds to provide optimal daylight comfort, glare prevention and view.

In another embodiment, the invention relates to a system of controlling task lighting condition in a space including multiple installed light sources and an external light source, the system includes: a lighting control unit, to estimate task illuminances from the multiple installed light sources and the external light source at a plurality of measuring areas within the space, control an intensity level of each of the installed light sources and an amount of light from the external light source entering the space based on the estimated illuminances, and determine a first positioning of at least one blind(s) for a window according to predetermined requirements and/or measurements, a daylight/blind control unit, to receive the plurality of measuring areas data within the space, determine a second positioning of the blinds according to predetermined requirements, select either the first or second positioning of the blinds to provide optimal daylight comfort, glare prevention and view.

In still another embodiment, the invention relates to a non-transitory computer readable medium having stored thereon instructions for causing a processor to perform a process of controlling task lighting condition in a space including multiple installed light sources, an external light source, at least one blind(s) for a window in the space, a lighting control unit and a daylight/blind control unit, the process including: estimating task illuminances of light from the multiple installed light sources and the external light source at a plurality of measuring areas within the space, controlling an intensity level of each of the installed light sources and an amount of light from the external light source entering the space based on the estimated illuminances, and determining a first positioning of the blinds according to predetermined requirements and/or measurements, receiving the plurality of measuring areas data within the space, determining a second positioning of the blinds according to predetermined requirements, selecting either the first or second positioning of the blinds to provide optimal daylight comfort, glare prevention and view.

In general, the various aspects of the invention may be combined and coupled in any way possible within the scope of the invention. The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

In a space having multiple controlled light fixtures, the light fixtures could be in a single office (uniform lighting in a space) or task lights for non-uniform distribution (multiple offices such as cubicles or single offices with task lights). Multiple sensors may be installed to sample the light levels in various locations throughout the space. In general an integrated closed-loop control algorithm then adjusts the light levels from each light fixture and controls window treatments in such a way that an overall desired light distribution is achieved.

According to the principles of the present invention an integrated-independent dual control system provides the optimal electric lighting and daylight to meet lighting distribution requirements. In particular, the daylight/blind (comfort) controller is the interface to the electric lighting and daylight/blind control systems and facilitates information exchange. The communication protocol adopted in the daylight/blind (comfort) controller is predetermined between the electric lighting and blind manufacturers to ensure proper interfacing and integration. Both the (open-loop) daylight/blind control system and the electric lighting (closed-loop) system can be installed and operated independently. The present invention is particularly suited for retrofit applications where only one of the electric lighting control (closed-loop) system or (open-loop) daylight/blind control system exists and the other is then added at a later date to further optimize the overall system and provide an integrated lighting control system.

The closed-loop signals will automatically be bypassed in the daylight/blind control (comfort) controller in the absence of the corresponding electric lighting control (closed-loop) system. On the other hand, when the compensating electric lighting control (closed-loop) system is in place, the performance of the integrated system will be significantly boosted by the (closed-loop) lightning control unit. Thus, the framework may advantageously reduce energy consumption and improve user visual comfort, and may not suffer from the shortcomings of control strategies as discussed above.

Figure 1:
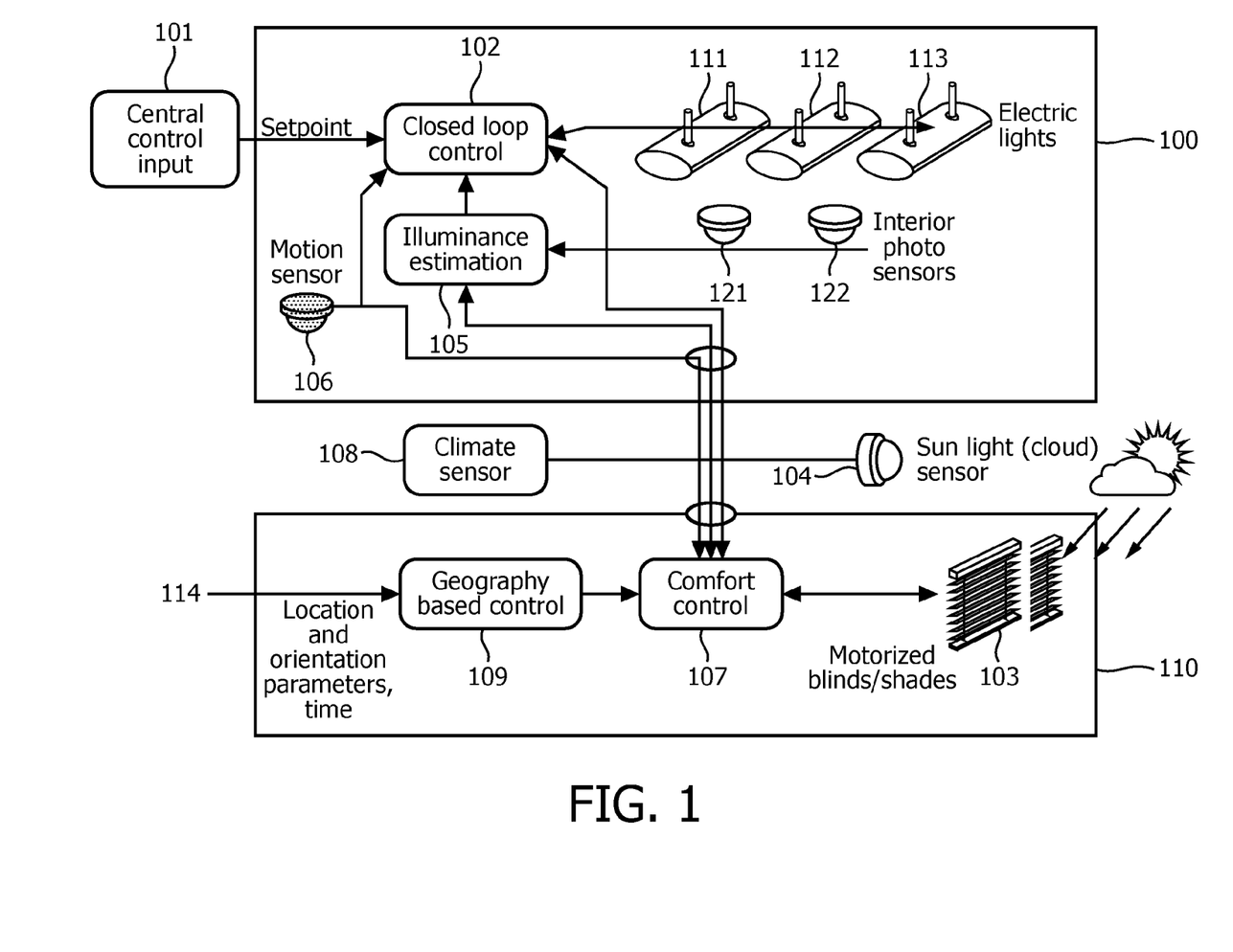
FIG. 1 shows a high level diagram of a lighting control system according to an embodiment of the invention.

FIG. 1 shows an embodiment of the implementation described herein. The system in FIG. 1 includes a closed loop electric lighting system 100 and an open loop daylight/blind control system 110. The closed loop electric lighting system 100 includes a closed loop lighting control unit 102, which receives inputs from photo sensors 121 and 122 for a space, a sun light (cloud) or photo sensor 104 for external light (e.g., sunlight) and climate senor 108 and motion sensor 106 (so that the luminosity can be reduced when the presence of a person is not detected). Note that the number of sensors does not need to be the same as the number of light fixtures, and the sensors do not need to be under each of the light fixtures. FIG. 1 assumes multiple sensors, but each light and the window blinds are adapting independently.

The algorithms used by the (closed-loop) lighting control unit 102 are known in the art, and are not described here in detail. One such algorithm is described in Provisional Patent Application 61/474,763, entitled "ADAPTIVE INTEGRATED DAYLIGHT AND ELECTRIC LIGHT CONTROL WITH MULTI-SENSOR FOR CONTROLLED-LIGHT DISTRIBUTION" filed by Dagnachew Birru, on Apr. 13, 2011, which is incorporated herein by reference. In general, however, one such algorithms includes the following: if the set point input is lower than the sensor reading (after applying calibration), then the electric lights will be dimmed with a certain step, and the blinds slat angles will be decreased (slats close) with a certain step. If the set point input is lower, then the opposite is performed.

Input to the (closed loop) lighting control unit 102 is also provided by Illuminace estimation unit 105, which also known as multipoint calibration, (or dynamic gain). The details of the multipoint calibration, (or dynamic gain, workplane illuminance estimation) are known in the art. In general, this unit attempts to modify the raw sensor reading as a function of window blind angles and height, exterior window illuminance and sun angle positions. This unit mitigates the issues resulting from changes in space reflection that single-calibration sensor deployed today suffer from. The calibration steps typically consist of taking multiple measurements at each reference point and fit them as a function of blind height, angle and day lighting information. These initial measurements are used to modify and fuse the output of the multiple sensors. For a single sensor scenario, it will be used like a dynamic gain of the sensor values that is dependent on environmental variables. Today's sensing schemes are essentially single-gain systems, leading to sub-par performance.

The illuminance estimation unit 105 provides an estimation of work-plane illuminance based on multiple calibration points. The multiple calibration points will be a function of blind slat angles, height and daylight entering the room.

The estimation of work-plane luminance and central control or user input 101 (set point input) and sensor data from the sensors 104, 121, 122, are processed by the (closed loop) lighting control unit 102 to produce an appropriate operating condition. In particular, the (closed loop) lighting control unit 102 calculates the dimming level of the electric lights and can then adjust the intensity of electric lights 111, 112, 113. The (closed loop) lighting control unit 102 also determines and transmits a first positioning information of the blinds according to the above predetermined requirements and/or measurements (e.g. sensor data and user set points) to a (open loop) daylight/blind (comfort) control unit 107 of the open loop daylight control system 110. The first positioning information includes slat angle position (or increment/decrement) and height of the motorized blinds/shades 103 to adjust the amount of external light (e.g., day light) entering the space through the window. The (closed loop) lighting control unit 102 also transmits/communicates the status of the motion sensor 106 and weather condition sensors 104 and 108 to the (open loop) daylight/blind (comfort) control unit 107.

The open loop daylight/blind control system 110 includes the motorized blinds/shades or window treatments 103 and a geography/geometrical information based control unit 109, such units are known in the art, and will not be described in detail herein. In general, these geography/geometrical information based control units usually operate with algorithms based on a form of solar clock, model of the windows/building and its surroundings, with certain assumptions about the interior and exterior environment. Such location and orientation parameters, time, etc. 114 are input into the geography/geometrical information based control unit 109. The open loop daylight/blind control system 110 also includes the (open loop) daylight/blind (comfort) control unit 107 that controls the motorized blinds/shades or window treatments 103 to modify the amount of external light entering into the space. Note that reference to "sunlight" does not limit the light exterior to the space as sunlight. Photo sensor for sunlight 104 may sense any light exterior to the space or specific to a source of light.

As indicated above, the (open loop) daylight/blind (comfort) control unit 107 receives the first positioning information and status of the sensors from the closed loop electric lighting system 100, as well as geography/geometrical information from the geography/geometrical information based control unit 109. The (open loop) daylight/blind (comfort) control unit 107 then calculates a second positioning information of the blinds according to the above predetermined requirements and/or measurements (e.g. received sensor data and geography/geometrical information). The second positioning information includes slat angle position (or increment/decrement) and height of the motorized blinds/shades 103.

Thereafter the (open loop) daylight/blind (comfort) control unit 107 selects between the (closed-loop blind) first position information coming from the closed-loop electric lighting control system 100 and the (open loop blind) second position information coming from (open loop) daylight/blind (comfort) control unit 107. In particular, the (open loop) daylight/blind (comfort) control unit 107 selection prevents glare and provide optimal daylight comfort and view to outside. For example, to avoid discomfort glare from daylight the present invention adjusts the position of the blinds to avoid high intensity light entering the work plane with an aim to reduce discomfort glare from direct sunlight. Moreover, measuring vertical illuminance at eye or luminance contrast ratios at the workplane, could also be combined and/or used for a more effective and optimum glare control. A study of large glare sources by Osterhaus (Osterhaus 1998) in 1998 showed a correlation between a subjective rating of glare (SGR) and vertical illuminance or overall brightness in the field of view of the occupant. A more recent paper by Osterhaus (Osterhaus 2008) illustrates that the ratio of (also, difference between) the average to median luminance in the field of view correlates strongly to subjective glare ratings. In 2006, Wienold and Christoffersen developed a new glare formula (DGP) (Wienold and Christoffersen 2006) to incorporate the effects from large glare sources. The DGP is based primarily on vertical illuminance at the eye combined with a term to account for individual glare sources. The (open loop) daylight/blind (comfort) control unit 107 also communicates the selected positioning information (e.g. blind slat angle position and height information) to the closed loop electric lighting control system 100.

Figure 2:
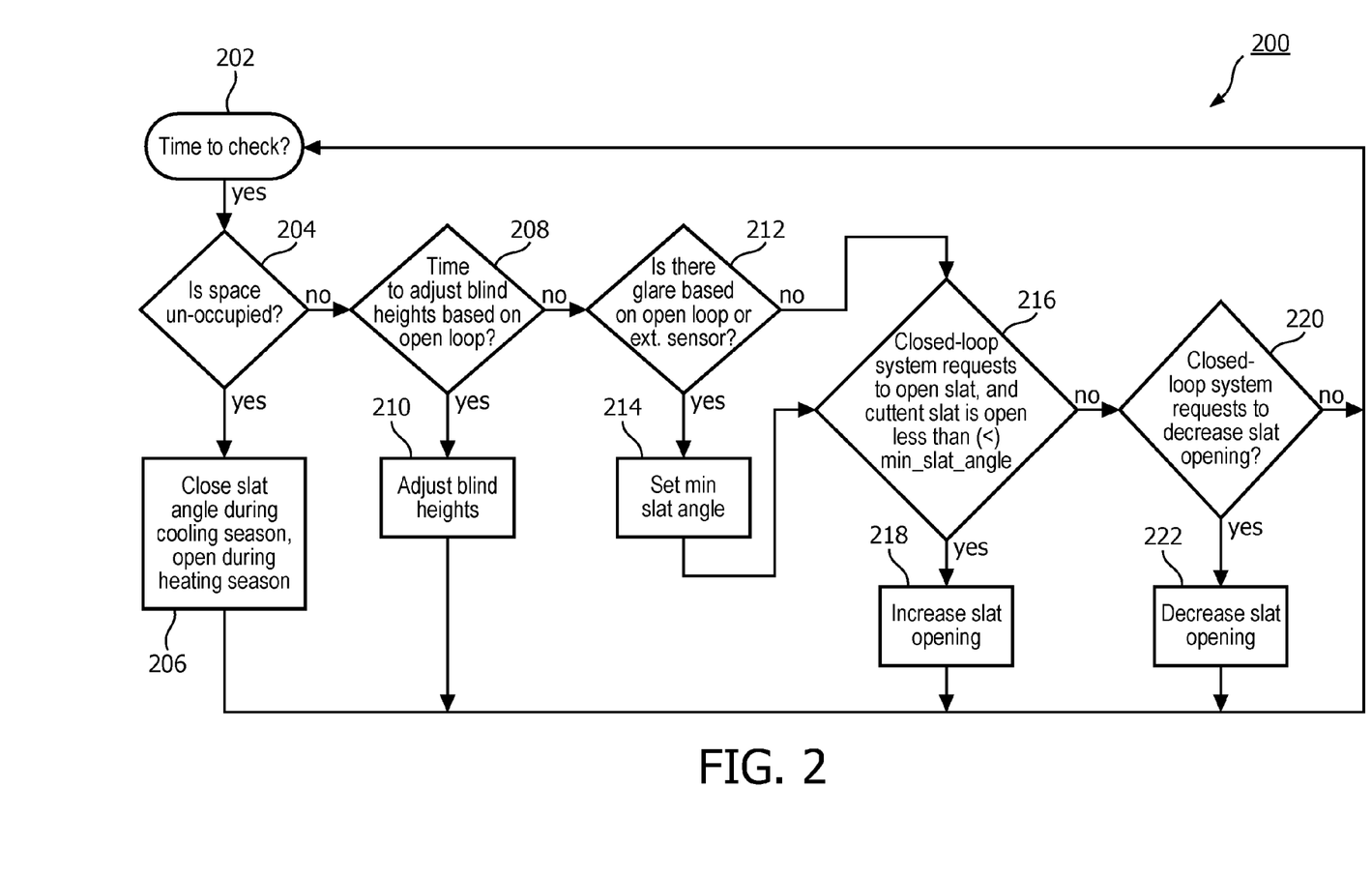
FIG. 2 shows a flow chart of a daylight/blind (comfort) control unit operation according to an embodiment of the invention.

FIG. 2 shows a flow chart of the open loop daylight/blind (comfort) control unit operation according to an embodiment of the invention.

The process 200 in this embodiment includes a determination of whether it is time check the system in operation 202, then a determination of whether the space is unoccupied in operation 204. If yes, the slat angle is closed during a cooling season, and open during a heating season in operation 206, then back to operation 202. If no, then the system determines if it is time to adjust the blind heights operation 208, based on the open loop system 110. If yes, the blind heights are adjusted in operation 210. If no, there is a determination of is there glare in operation 212, based on the open loop system 110 or external sensor 104, which results in setting a minimal slat angle in operation 214. The next step is to determine if the closed-loop system 100 is requesting to open the slat and if the current slat is open lass then the minimal slat angle, in operation 216. If yes, the slat opening is increased in operation 218 and back to operation 202. If no, then continue to see if the closed-loop system 100 is requesting to decrease the slat opening in operation 220. If no, back to operation 202, if yes the slat opening is decreased in operation 220 and the back to operation 202.

Figure 3:
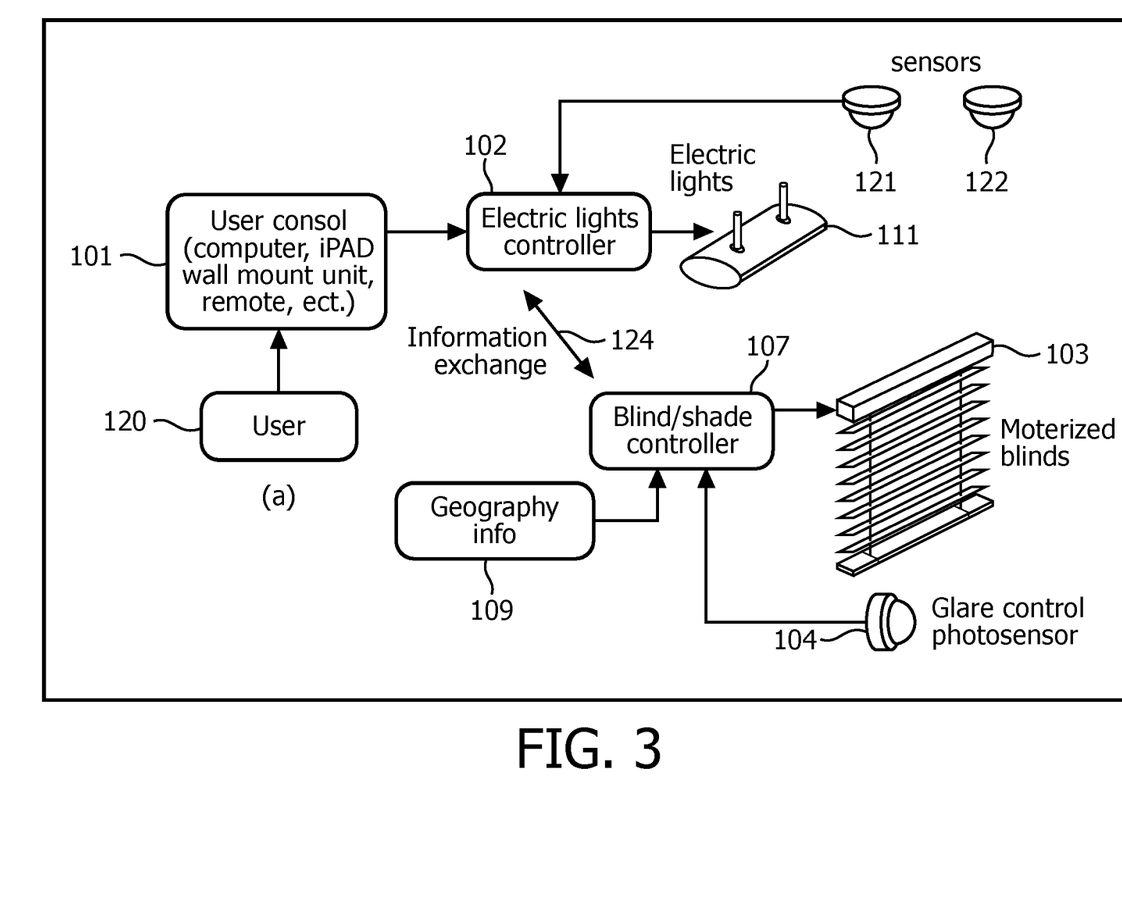
FIG. 3 shows a high level diagram of a lighting control system according to another embodiment of the invention.

FIG. 3 shows a high level diagram of a lighting control system according to another embodiment of the invention. The system in FIG. 3 includes a closed loop or lighting control unit 102, which receives inputs from photo sensors 121 and 122 for a space, a glare control or photo sensor 104 for external light (e.g., sunlight). The system also includes the motorized blinds/shades or window treatments 103 and a geography/geometrical information 109 and the (open loop) daylight/blind (comfort) control unit 107 that controls the motorized blinds/shades or window treatments 103 to modify the amount of external light entering into the space and a common bus 124. The blinds 103 and electric lights 111 via their respective control units exchange information over the common bus 124. Such information includes blind slat angles, height, sensor information, electrical light status, user actions/wishes, etc. In this embodiment, each unit (e.g. 102 and 107) optimizes its own performance cognizant of the other's performance.

By using the bus 124 the height of the blinds/shades, via the open-loop daylight/blind control unit, can be adaptively adjusted to meet interior lighting and visual requirements in such a way that frequent movement of the blinds/shades is minimized and that energy savings (daylight utilization) is maximized. Accordingly the system enables adaptive adjustment of both (1) the height of motorized shading systems to meet user-specific conditions inside the building and (2) intensity level (increasing/decreasing) of each of the installed light sources to maximize daylight utilization and save energy. The user specific conditions include glare and lighting contrast, light intensity and view to outside.

Figure 4:
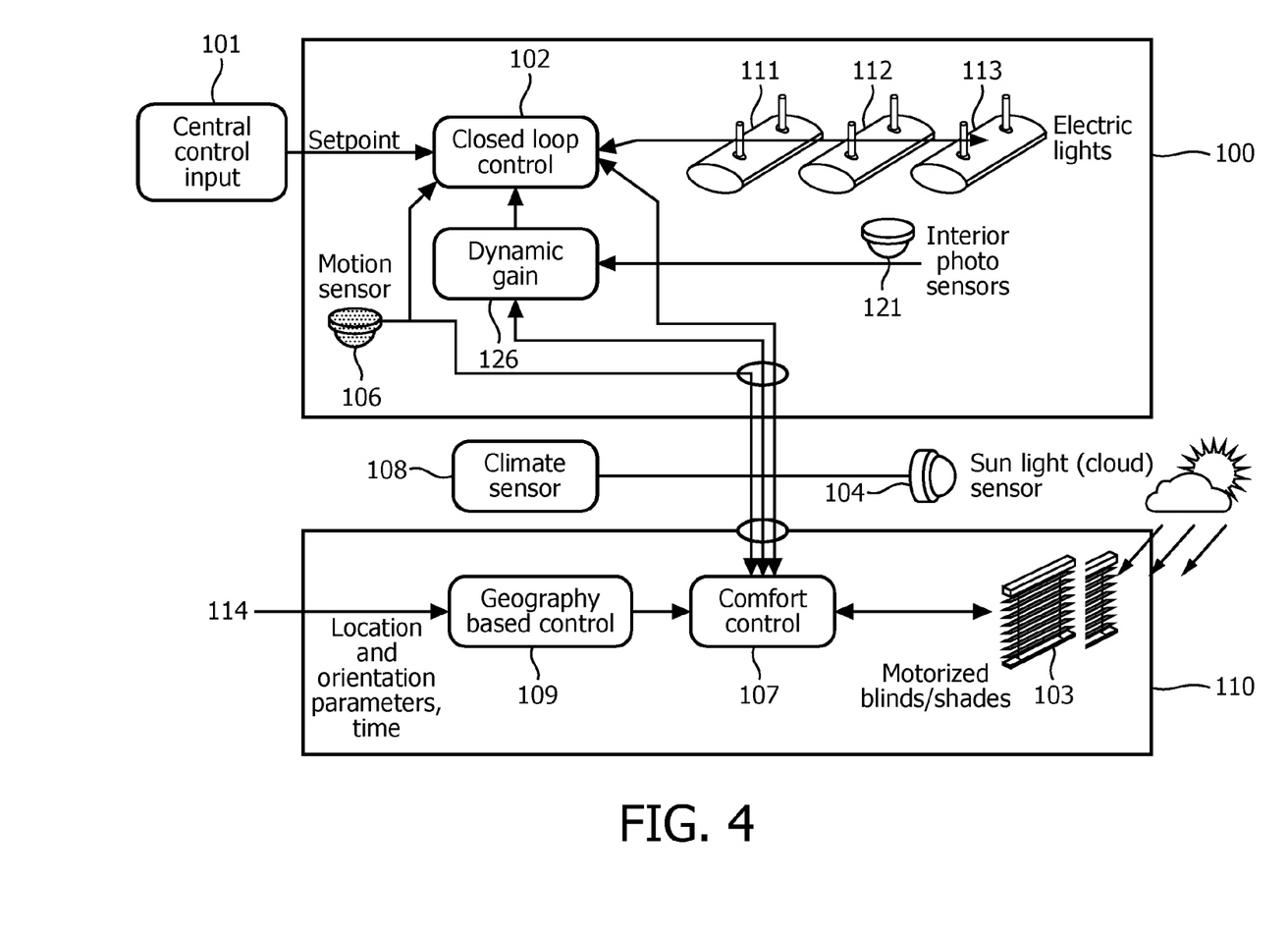
FIG. 4 shows a high level diagram of a lighting control system according to another embodiment of the invention.

FIG. 4 shows a high level diagram of a lighting control system according to another embodiment of the invention. The embodiment of FIG. 4 includes a single photosensor 121. Thus, the workplane illuminance estimation unit can be viewed as a Dynamic Gain 126 for the sensor, or a multi-point calibration sensor.

This disclosure is applicable to lighting controls and energy management in buildings and homes.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this disclosure.

Most preferably, the principles of the invention are implemented as any combination of hardware, firmware and software. Moreover, the software is preferably implemented as an application program tangibly embodied on a program storage unit or computer readable storage medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. A method of controlling light distribution in a lighting system for a space, said lighting system including an artificial light source, at least one blind(s) in the space, a lighting control unit and a daylight/blind control unit, the method comprising the steps of:
   in the lighting control unit,
      estimating illuminances emitted by the artificial light source and an external/daylight light source at a plurality of measuring areas within the space;
      calculating an intensity level of the artificial light source based on the estimated illuminances; and
      determining a first positioning of the blinds according to predetermined lighting system/user requirements and/or measurements by the lighting system;

in the daylight/blind control unit,
receiving the plurality of measuring areas data within the space;
determining a second positioning of the blinds according to predetermined lighting system/user requirements;
using either the first or second positioning of the blinds according to predetemined criteria to provide optimal daylight comfort, glare prevention and view.

2. The method according to claim 1, wherein in the step of determining a first positioning of the blinds according to predetermined requirements and/or measurements, the predetermined requirements and/or measurements are user requirements and one or more of the plurality of measuring areas data within the space.

3. The method according to claim 1, wherein in the step of determining a second positioning of the blinds according to predetermined requirements, the predetermined requirements are specified based on geographical location and geometrical information of the space and external light source.

4. The method according to claim 1, wherein the selecting either the first or second positioning of the blinds to provide optimal daylight comfort, includes determining the optimal positioning to prevent glare, provide optimized viewing through an associated window of the blind positioning and energy efficiency.

5. The method according to claim 1, wherein the step of determining the first or second positioning of the blinds includes determining slat angle position of the blinds and blind(s) heights.

6. The method according to claim 1, wherein the daylight/blind control unit further includes the step of providing the selected first or second positioning of the blinds to the lighting control unit.

7. The method according to claim 6, wherein the lighting control unit further includes the step of using the selected first or second positioning of the blinds to re-determine the intensity level of each of the installed light sources.

8. A lighting system for controlling light distribution in a space including an artificial light source, the lighting system comprising:
a lighting control unit, to estimate illuminances emitted by the artificial light source and an external/daylight light source at a plurality of measuring areas within the space, control an intensity level of the artificial light source and an amount of light from the external light source entering the space based on the estimated illuminances, and determine a first positioning of at least one blind(s) for a window according to predetermined requirements and/or measurements;
a daylight/blind control unit, to receive the plurality of measuring areas data within the space, determine a second positioning of the blinds according to predetermined requirements, and
use either the first or second positioning of the blinds according to predetermined criteria to provide optimal daylight comfort, glare prevention and view.

9. The system according to claim 8, wherein the lighting control unit determines the first positioning of the blinds according to user requirements and one or more of the plurality of measuring areas data within the space.

10. The system according to claim 8, wherein the daylight/blind (comfort) control unit determines the second positioning of the blinds according to geographical location and geometrical information of the space and external light source.

11. The system according to claim 8, wherein the daylight/blind (comfort) control unit selects either the first or second positioning of the blinds to provide optimal daylight comfort, includes determining the optimal positioning to prevent glare, provide optimized viewing through an associated window of the blind positioning and energy efficiency.

12. The system according to claim 8, wherein the lighting control unit and the daylight/blind control unit, respectively, determine the first or second positioning of the blinds, they also determine slat angle position of the blinds and blind(s) heights.

13. The system according to claim 8, wherein the daylight/blind control unit further includes providing the selected first or second positioning of the blinds to the lighting control unit.

14. The system according to claim 13, wherein the lighting control unit further includes using the selected first or second positioning of the blinds to re-determine the intensity level of the installed light source.

15. A non-transitory computer readable medium having stored thereon instructions for causing a processor to perform a process of controlling light distribution in a lighting system for a space, said lighting system including an artificial light source, at least one blind(s) in the space, a lighting control unit and a daylight/blind control unit, the process comprising:
estimating illuminance levels of light emitted by the artificial light source and an external/daylight source at a plurality of measuring areas within the space;
controlling an intensity level of the installed light source and an amount of light from the external light source entering the space based on the estimated illuminance levels; and
determining, in the lighting control unit, a first positioning of the blinds according to predetermined lighting system/user requirements and/or measurements by the lighting system;
receiving the plurality of measuring areas data within the space;
determining, in the daylight/blind control unit, a second positioning of the blinds according to predetermined requirements;
using either the first or second positioning of the blinds according to predetermined criteria to provide optimal daylight comfort, glare prevention and view.

* * * * *